Figure 1:
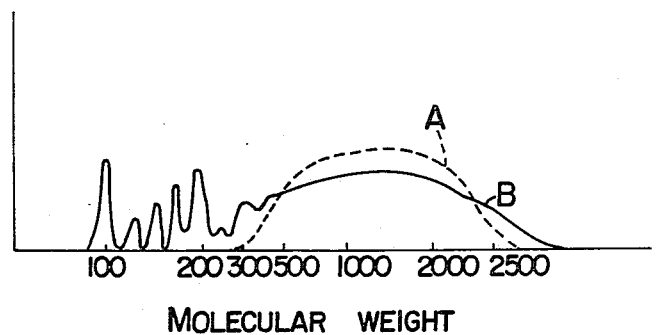

United States Patent [19]

Konii et al.

[11] 4,198,499

[45] Apr. 15, 1980

[54] PROCESS FOR PRODUCING NEUTRALIZED PHENOL RESINS

[75] Inventors: Susumu Konii, Tokyo; Masatoshi Yoshida, Shimodate; Yukio Yoshimura, Saitama; Takehiko Ishibashi; Shizuo Sakamoto, both of Shimodate, all of Japan

[73] Assignee: Hitachi Chemical Company, Inc., Japan

[21] Appl. No.: 937,116

[22] Filed: Aug. 28, 1978

[30] Foreign Application Priority Data

Aug. 29, 1977 [JP] Japan ................................ 52-104033

[51] Int. Cl.$^2$ ................................................ C08G 2/28
[52] U.S. Cl. ...................................... 528/146; 528/147; 528/165
[58] Field of Search .......................... 528/146, 147, 165

[56] References Cited

U.S. PATENT DOCUMENTS

| | | | |
|---|---|---|---|
| 1,909,788 | 5/1933 | Pantke | 528/147 X |
| 1,909,789 | 5/1933 | Pantke | 528/147 X |
| 1,946,459 | 2/1934 | Granger | 528/147 |
| 2,457,493 | 12/1948 | Redfern | 528/147 |
| 2,541,688 | 2/1951 | Cardwell | 528/146 X |
| 2,609,352 | 9/1952 | Kvalnes | 528/165 X |
| 2,748,101 | 5/1956 | Shappell | 528/147 X |
| 2,819,251 | 1/1958 | Cleek et al. | 528/165 X |
| 3,083,170 | 3/1963 | Booty | 528/147 X |
| 3,657,188 | 4/1972 | Perkins | 528/165 X |
| 3,884,859 | 5/1975 | Honda et al. | 528/147 X |
| 4,033,909 | 7/1977 | Papa | 528/165 X |

*Primary Examiner*—Howard E. Schain
*Attorney, Agent, or Firm*—Craig & Antonelli

[57] ABSTRACT

Resol type phenol resins containing scarcely or no phenol mononucleus compounds (monomers) and phenol dinuclei compounds (dimers) and their methylolated derivatives and scarcely containing molecules having an apparent molecular weight of more than 2500 are produced by reacting phenol with formaldehyde in the presence of an alkaline catalyst in a molar ratio of 3.0 to 6.0 moles of formaldehyde and 0.05 to 2.0 moles of the alkaline catalyst per mole of phenol, neutralizing the reaction solution with an acid to pH 4.5 to 6.5 and precipitating the resulting product for separation.

11 Claims, 2 Drawing Figures

PROCESS FOR PRODUCING NEUTRALIZED PHENOL RESINS

This invention relates to a process for producing resol type phenol-formaldehyde resins containing scarcely or no phenol mononucleus compounds (monomers) and phenol dinuclei compounds (dimers) and their methylolated derivatives and scarcely containing molecules having an apparent molecular weight of more than 2500.

Resol type phenol resins soluble in alcohol have been used as adhesives, foundry binders, molding compounds, laminates, copper-clad laminates, etc., but they are often poor in coating or impregnating properties for substrates or aggregates or base materials because of containing a large amount of high molecular weight components therein. On the other hand, water soluble phenol resins which use water as a major solvent contain a large amount of low molecular weight components, particularly unreacted phenol, in most cases, in order to maintain its water solubility. Such water soluble phenol resins are poor in adhesive strength and slow in curing rate, and further the unreacted phenol gives various harmful influences.

It is an object of the present invention to provide a process for producing resol type phenol resins improved in various defects of the conventional phenol resins as mentioned above, that is, improved in adhesive strength, coating properties, impregnating properties, and curing rate.

The present invention provides a process for producing a phenol resin which comprises reacting phenol with formaldehyde in the presence of an alkaline catalyst in a molar ratio of 3.0 to 6.0 moles of formaldehyde and 0.05 to 2.0 moles of the alkaline catalyst per mole of phenol, neutralizing the reaction solution with an acid to pH 4.5 to 6.5, and precipitating the resulting product for separation.

The accompanying drawings show molecular weight distributions of the resins obtained in the examples mentioned hereinafter.

According to the present invention, there is obtained a water soluble phenol resin having methylol groups as many as possible and scarcely containing phenol mononucleus compounds (monomers) and phenol dinuclei compounds (dimers) and their methylolated derivatives as well as Y component which has apparent molecular weight of more than 2500.

The term "water soluble phenol resin" means a resol type phenol resin obtained by reacting a phenol with formaldehyde in the presence of an alkaline catalyst such as sodium hydroxide, ammonia, an amine, or the like. The term "Y component which has apparent molecular weight of more than 2500" means a high polymer which has such a molecular volume as not to permeate liquid chromatographically through a styrene series gel column having a pore size of from 2000 Å to 3000 Å.

As formaldehyde, there can be used formalin (an aqueous solution of formaldehyde), paraformaldehyde, hexamethylenetetramine, and other compounds which can generate formaldehyde.

As the alkaline catalyst, there can be used oxides or hydroxides of alkali metals such as sodium, potassium and lithium, tertiary amines such as trimethylamine, triethylamine, tripropylamine, tributylamine, triamylamine, triallylamine, dimethylaniline, diethylaniline, tribenzylamine, triphenylamine, benzyldimethylamine, and the like.

Formaldehyde is used in an amount of 3.0 to 6.0 moles, preferably 3.5 to 6.0 moles, per mole of phenol. Such an amount is about 2 or 3 times as much as that used in a conventional process.

The alkaline catalyst is used in an amount of 0.05 to 2.0 moles, preferably 0.1 to 1.0 moles, per mole of phenol.

If formaldehyde and the alkaline catalyst are used in amounts outside the above-mentioned ranges, the objects of the present invention cannot be attained.

The reaction of phenol with formaldehyde can be carried out at a temperature of 40° to 100° C., preferably 50° to 80° C., until water miscibility degree becomes about 4.0 ml/g (30° C.) or less, preferably 0.3-2.0 ml/g (30° C.).

Water miscibility degree is measured as follows: Precisely weighed 1 g of the reaction solution is placed in a 100 ml beaker and kept at 30° C. Water kept at 30° C. is dropped from a buret to the reaction solution and the amount of water necessary to make the solution cloudy is measured.

The reaction solution is then neutralized with an acid to pH 4.5 to 6.5. As the acid, there can be used inorganic acids such as sulfuric acid, hydrochloric acid, carbonic acid, and the like, and organic acids such as acetic acid, para-toluenesulfonic acid, benzenesulfonic acid, formic acid, and the like. Preferable acids are strong acids having dissociation constant of $10^{-2}$ or more such as sulfuric acid, hydrochloric acid, p-toluenesulfonic acid and benzenesulfonic acid.

In the neutralizing step, pH should be in the range of 4.5 to 6.5. If the pH is greater than 6.5, phenol trinuclei compounds (trimer) and their methylolated derivatives become soluble in the aqueous solution, so that they are hardly contained in a precipitated resin. If the pH is smaller than 4.5, phenol dinuclei compounds (dimers) and their methylolated derivatives become insoluble in the aqueous solution, so that they are to be included in a precipitated resin.

Methylol groups in resol type phenol resins generally change to methylene groups by heating to produce higher polymers. The methylol groups also change to methylene groups by an excess of acid. In order to suppress changing to methylene groups as low as possible during the neutralizing step, it is important to maintain the temperature as low as possible and to add the acid as slow as possible in order to lower the pH gradually. In the present invention, temperature rise by the evolution of heat of neutralization can be suppressed by sufficient cooling and the production of higher polymers can be suppressed by adding the acid gradually with sufficient stirring. Thus, it is preferable to conduct the neutralization step at a temperature of 30° C. or less.

After the neutralization, stirring is stopped and the resulting product is allowed to stand at a low temperature to accelerate the precipitation of the resin. The precipitated resin can be separated from the reaction solution by a conventional method.

The present invention is explained in more detail by way of the following examples.

EXAMPLE 1

In a four-necked flask equipped with a condenser and a stirring apparatus, 94 g of phenol and 325 g of 37% formaldehyde were placed and 8 g of 50% sodium hydroxide was added thereto. The reaction was carried out at 75° C. until water miscibility degree became 0.5 ml/g (30° C.). Subsequently, the reaction solution was cooled and neutralized with acetic acid to pH 5.0. The resulting precipitate was separated to give the desired phenol resin.

COMPARATIVE EXAMPLE 1

In a four-necked flask equipped with a condenser and a stirring apparatus, 94 g of phenol and 190 g of 37% formalin were placed and 4 g of 50% sodium hydroxide was added thereto. The reaction was carried out at 40° C. until a viscosity became 120 cp/30° C. to give a water soluble phenol resin having infinite dilution with water.

Molecular weight distribution of the resin produced by Example 1 obtained by gel permeation chromatography is shown in the curve A of FIG. 1 and that of the resin produced by Comparative Example 1 obtained by gel permeation chromatography is shown in the curve B of FIG. 1.

EXAMPLE 2

In a four-necked flask equipped with a condenser and a stirring apparatus, 94 g of phenol and 290 g of 37% formaldehyde were placed and 8 g of 50% sodium hydroxide was added thereto. The reaction was carried out at 60° C. until water miscibility degree became 0.4 ml/g (30° C.). Subsequently, the reaction solution was cooled and neutralized with hydrochloric acid to pH 6.5. The resulting precipitate was separated to give the desired phenol resin.

COMPARATIVE EXAMPLE 2

The procedure of Example 2 was repeated except for using 2 g of 50% sodium hydroxide. Since the precipitate obtained was hardly soluble in methanol, a 75% methanol-acetone solution of the resin was obtained by using a mixed solvent of methanol and acetone (1:1 by weight).

Figure 2:
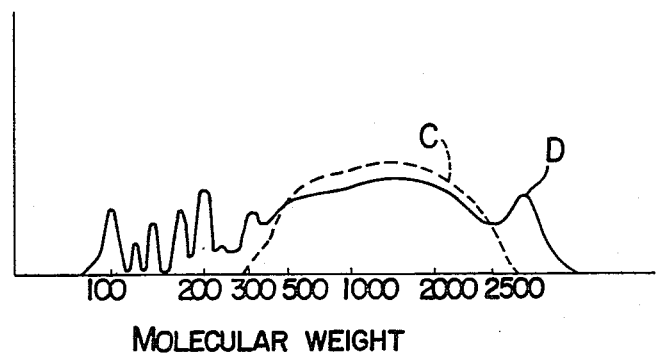

Molecular weight distributions of the resin obtained by Example 2 (curve C) and the resin obtained by Comparative Example 2 (curve D) are as shown in FIG. 2.

As mentioned above, according to the present invention, it is possible to obtain resol type phenol resins scarcely containing phenol mononucleus compounds (monomers), phenol dinuclei compounds (dimers) and their methylolated derivatives as well as molecules having an apparent molecular weight of more than 2500.

Since the phenol resins obtained by the process of the present invention are particularly excellent in adhesion, coating properties, impregnating properties, rapid curability, and the like, they can be used as adhesives, foundry binders, molding compounds, laminates, copper-clad laminates, etc., for improving the properties greatly. Further since the phenol resins obtained by the process of the present invention scarcely contain low molecular weight compounds such as phenol mononucleus compounds (monomers), phenol dinuclei compounds (dimers), and their methlolated derivatives, various defects derived from the low molecular weight compounds as well as environmental pollution are improved greatly.

What is claimed is:

1. A process for producing a phenol resin which comprises reacting phenol with formaldehyde in the presence of an alkaline catalyst in a molar ratio of 3.5 to 6.0 moles of formaldehyde and 0.05 to 2.0 moles of the alkaline catalyst per mole of phenol at a temperature of 40° C. to 100° C. until a water miscibility degree of the reaction product becomes 0.3 to 2.0 ml/g, as measured at 30° C., neutralizing the reaction solution with an acid to pH 4.5 to 6.5, and precipitating the resulting product for separation.

2. A process according to claim 1, wherein the alkaline catalyst is present during the reacting of formaldehyde with phenol at a molar ratio of 0.1 to 1.0 moles of alkaline catalyst per mole of phenol.

3. A process according to claim 1, wherein the alkaline catalyst is an oxide or hydroxide of sodium, potassium or lithium or a tertiary amine.

4. A process according to claim 1, wherein the neutralization step is carried out at a temperature of 30° C. or less.

5. A process according to claim 1, wherein the acid used in the neutralization step is an acid having a dissociation constant of $10^{-2}$ or more.

6. A process for producing a resol phenol resin scarcely containing phenol mononucleus compounds, phenol dinuclei compounds and their methylolated derivatives as well as molecules having an apparent molecular weight of more than 2500 which comprises reacting one mole of phenol with 3.5–6.0 moles of formaldehyde in the presence of 0.2 to 2.0 moles of an alkaline catalyst at a temperature of 40° C. to 100° C. until a water miscibility degree of the reaction product becomes 0.3 to 2.0 ml/g, as measured at 30° C., and then neutralizing with an acid to pH 4.5 to 6.5 to precipitate and separate the resin.

7. A process according to claim 1, wherein said alkaline catalyst is selected from the group consisting of trimethylamine, triethylamine, tripropylamine, tributylamine, triamylamine, triallylamine, dimethylaniline, diethylaniline, tribenzylamine, triphenylamine, and benzyldimethylamine.

8. A process according to claim 1, wherein phenol is reacted with formaldehyde at a temperature of 50° C. to 80° C.

9. A process according to claim 1, wherein the acid used in the neutralization step is an acid selected from the group consisting of sulfuric acid, hydrochloric acid, carbonic acid, acetic acid, para-toluenesulfonic acid, benzenesulfonic acid and formic acid.

10. A process according to claim 5, wherein said acid having a dissociation constant of $10^{-2}$ or more is selected from the group consisting of sulfuric acid, hydrochloric acid, p-toluenesulfonic acid and benzenesulfonic acid.

11. A process according to claim 4, wherein the reaction solution is stirred while carrying out the neutralization step.

* * * * *